United States Patent [19]

Merchant et al.

[11] 4,329,210

[45] May 11, 1982

[54] METHOD OF REGENERATING ETCHANT AND RECOVERING ETCHED METAL

[75] Inventors: Vijay Merchant, Dayton; Stephen R. Henriksen, Kettering; R. Wayne Boucher; Jerrold J. Dodd, both of Dayton, all of Ohio

[73] Assignee: Robert W. Becker, Kettering, Ohio; a part interest

[21] Appl. No.: 134,784

[22] Filed: Mar. 28, 1980

[51] Int. Cl.[3] .............................................. C25C 1/12
[52] U.S. Cl. .................................... 204/107; 75/117; 156/642; 204/108; 210/662; 210/674; 210/688; 423/24
[58] Field of Search .................. 75/101 BE, 109, 117; 134/10; 156/642, 666; 204/106, 107, 108; 210/662, 674, 677, 688; 423/24

[56] References Cited

U.S. PATENT DOCUMENTS

| | | | |
|---|---|---|---|
| 3,116,240 | 12/1963 | Downey et al. | 156/642 |
| 3,725,259 | 4/1973 | DePree | 75/101 BE |
| 3,905,827 | 9/1975 | Goffredo et al. | 134/10 |
| 4,083,758 | 4/1978 | Hamby et al. | 423/24 |
| 4,190,481 | 2/1980 | Goffredo | 156/642 |
| 4,252,621 | 2/1981 | Reinhardt et al. | 156/642 |

*Primary Examiner*—Ivars C. Cintins
*Attorney, Agent, or Firm*—Becker & Becker, Inc.

[57] ABSTRACT

A method of regenerating etchant and recovering etched metals. Etching solution, which is overladen with metal cations is passed through a cation exchange unit. Subsequently, the etching solution, which is diminished in metal cation concentration, is returned to the etcher sump. The cation exchange unit is then rinsed with deionized water to remove residual etching solution, with the effluent being conveyed to a metal recovery unit. The cation exchange unit is then rinsed with an aqueous solution of an acid to remove cations and to regenerate the cation exchange unit. The effluent from this rinsing is also conveyed to the metal recovery unit. The cation exchange unit is then rinsed with deionized water to remove residual acid, with this effluent likewise being conveyed to the metal recovery unit. Subsequently, a selectolyte solution is passed through the cation exchange unit to enhance the cation retention property thereof. The effluent is conveyed to a storage container. At this point, etched metal can be recovered from the metal recovery unit.

10 Claims, 1 Drawing Figure

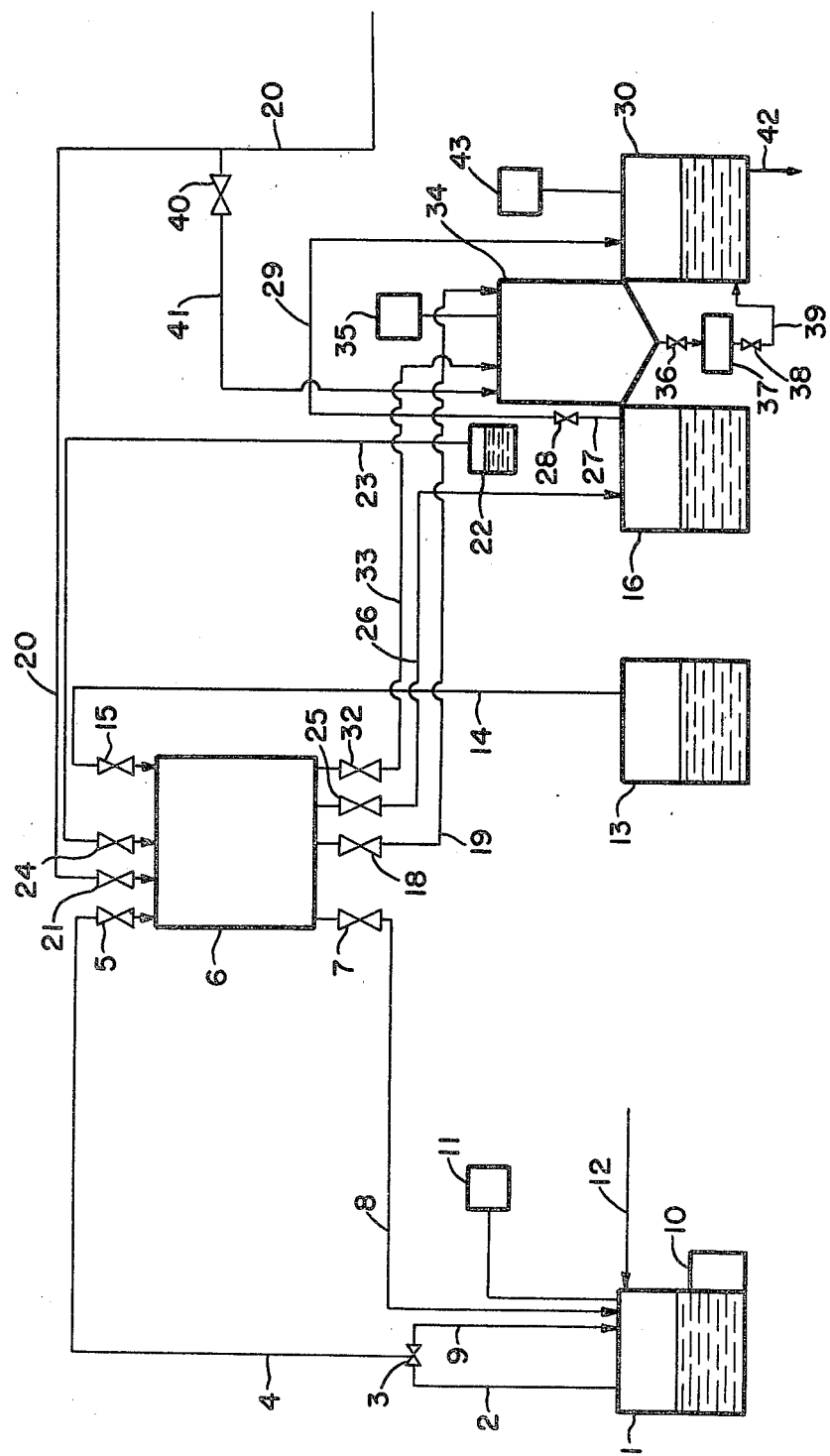

METHOD OF REGENERATING ETCHANT AND RECOVERING ETCHED METAL

The present invention relates to a method of regenerating etchant and recovering etched metal.

Chemical etching processes are utilized on a large scale by industry for producing components. Manufacturers of printed circuit boards and the like represent the users of chemical etchants. Conductive circuit patterns are obtained, for example, from copper coated insulating materials such as F.R.P., epoxy resins, etc. The copper layer is selectively coated in a photographic process with etch photo resist. The exposed copper is then removed by chemical etchants.

A heated ammoniacal solution is generally sprayed or brought into contact with the copper surface which is to be etched. Ammonium hydroxide and ammonium salts combine with copper ions to form a cupric ammonium complex ion $Cu(NH_3)_4^{+2}$ which holds etched and dissolved copper in solution at 18.0 to 30.0 oz./gal. As the copper concentration builds up due to the etching process, the effectiveness of the solution decreases.

Principal methods of regeneration for maintaining a controlled etching process are:
1. Removal of a portion of the spent etching solution from the etcher sump under controlled conditions, and replenishing the removed etchant.
2. Acidification to precipitate copper hydroxide, which is filtered off and leaves a solution requiring readjustment of chemical balance and pH. Adjustment of pH must be carried out with utmost care. Furthermore, excess HCl will produce explosive gases of $ClO_2$ and chlorine.
3. Liquid-liquid extraction process involving mixing spent etchant with organic solvent, e.g. hydroxyoxime, to extract copper. An organic layer containing copper is mixed with aqueous sulfuric acid, which extracts the copper to form copper sulfate. However, regeneration by this method is expensive, and is limited to large manufacturing facilities.

Regeneration methods presently being used either do not address the pollution problem, relying heavily on the supplier for haulaway, or the ones that do, e.g. (3), are too expensive to be viable for a small to medium sized manufacturer.

It is an object of the present invention to provide a true regeneration of etchant.

Another object is to prevent pollution by recovering etched material.

A further object is to return regenerated etchant to the etcher sump, after removal of copper, with greatly reduced etching parameter adjustment requirements.

Yet another object is to carry out the regeneration in a safe and continuous manner.

Another object is to selectively treat the cation exchange resin for return of the etchant to the etcher sump, and for recovery of the etched material.

These objects, and other objects and advantages of the present invention, will appear more clearly from the following specification in connection with the accompanying drawing, which is a schematic example of a system employing the inventive method.

The present invention provides a method to remove a metal cation from an ammoniacal etching solution while maintaining a continuous etching process. The method involves passing the etching solution, which is overladen with metal cations, through a cation exchange unit. Subsequently, the etching solution, which is diminished in metal cation concentration, is returned to the etcher sump. The cation exchange unit is a column containing a cation exchange resin bed. The cation exchange resins are strongly acidic cation exchange resins, such as polystyrene matrix with a nuclear sulfonic acid active group, a sulfonated polystyrene crosslinked with divinyl benzene, or a phenolic matrix with a methylene sulfonic active group. Such resins are commercially available under trade names such as Amberlite IR-120 Plus (Rohm & Haas), Dowex 50 (Dow Chemical Co.,), Duolite C-20 (Diamond Shamrock Chemical Corp.), and Ionac 240 to 249 (Ionac Chemical Corp.).

By way of example, cupric ammonium complex ions $Cu(NH_3)_4^{+2}$ in ammonium hydroxide and ammonium chloride may be the active etchant, which reacts with metallic copper to yield cuprous ions, cuprous being rapidly oxidized to the cupric state by air oxidation:

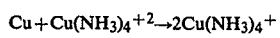

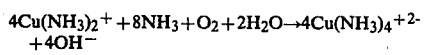

Etching can be continued with formation of $Cu(NH_3)_4^{+2}$ oxidized by air during etching as long as the copper-holding capacity is not exceeded.

To regenerate cation exchange resin in its hydrogen form, a solution containing ammonium hydroxide and ethylenediaminetetraacetic acid (EDTA), is added, the latter being employed as a chelating agent. Such a solution, for the purpose of this invention, will henceforth be referred to as a "selectolyte" solution. Typical, though by no means all inclusive, ranges for the constituents and parameters of the selectolyte solution are set forth in the following table:

| Selectolyte Solution | moles/liter |
| --- | --- |
| Ammonium Hydroxide | 1.0–3.0 |
| Ethylenediaminetetraacetic Acid (Di-Sod Salt) | 0.015–0.15 |
| Water q.s. to pH | 1 Liter<br>10.0–11.0 |

The purpose of the selectolyte solution is to enhance, by as much as a multiple of 5 or more, the cation retention property of the cation exchange resin.

The selectolyte solution can also be prepared by using other compatible chelating agents, such as triethylenetetraamine, diethylenetriamine, or any other commercially available chelating agents, e.g. Versenes (Dow Chemical Co.).

A stream of the etching solution which needs to be regenerated is passed through the selectolyte-treated cation exchange resin. The ion exchange substance in contact with the stream exchanges copper ions with ammonium ions, thereby allowing the etching solution to return to the etcher sump at operating parameters, such as adjusted pH and diminished metal ion concentration. The ion exchange substance is regenerated using a solution of hydrochloric or sulfuric acid followed by a backwash cycle. The backwash and the regeneration liquor containing the metal cation are mixed, for example, in an electrowinning tank or in a metal ion replacement tank.

With the electrowinning method, the copper is present in solution as an acid salt, this solution being the electrolyte. An anode and cathode arrangement is used to plate the copper on the cathode when electric current is applied. An insoluble anode is used. The electrolyte, after being diminished in copper value, is passed to a waste treatment tank where the pH of the solution is raised to approved release levels, and the solution is discharged, for example to a sewer. With the metal ion replacement method, the metal cation is replaced from the solution to its salt by metals above it in the electrochemical series. For example, copper ions may be replaced by aluminum ions. The copper is filtered, and the resulting effluent is passed to a waste treatment tank, where the pH of the solution is raised to release levels, and the solution is discharged to a sewer. Of course, any other suitable method for recovering metal may be used.

Referring now to the drawing in detail, the etcher 1, which contains the etching solution which is to be subjected to regeneration, is of the spray or splash type etcher, or the like. The etching solution contains an active etchant and dissolved cations, which are present as a result of etching of a piece having a surface of an etchable material, e.g. a metal. The cations are complexed if the etchant is ammoniacal. The etching solution in unit 1 is continuously circulated via stream 2 through valve 3, and is returned via stream 9 to unit 1. The Baumé monitor unit 10, containing a hydrometer or any other Baumé reading apparatus, has the capability to read Baumé and remotely actuate valve 3.

When the Baumé of the etching solution has reached such upper limits that etching is greatly diminished or even stopped, i.e. the metal cation concentration in the etchant is too high, the unit 10, which continuously reads the Baumé of the etching solution, opens valve 3 to stream 4, and shuts it to stream 9. The solution in stream 4 passes via valve 5 into an ion exchange unit 6, which is a cation exchange resin bed in which the metal cations are selectively retained, and which selectively releases cations derived from the selectolyte solution. The resultant stream of regenerated etchant, which is slightly lower in pH or at influent stream pH, but within etching pH parameter, is returned through valve 7 via stream 8 to unit 1. Unit 11 is a pH control unit, employing a standard pH electrode, and has the capability to continuously read pH and to allow a flow of solution via stream 12 to adjust the pH and other operating parameters, such solutions being commonly referred to by suppliers as replenisher solutions. Such replenisher solutions contain etchant and, at most, a very low metal ion concentration. Stream 8, which contains a lower concentration of the metal cations than does the stream 4, results, upon return to unit 1 and mixing with the etching solution therein, in lowering of the Baumé of the etching solution.

The cation exchange unit 6, which is laden with metal cations, must now be regenerated. Deionized water, via stream 20, is passed through valve 21 into the cation exchange bed 6 to remove residual etching solution. The resultant stream, containing residual etching solution, is passed through valve 32 via stream 33 into the metal recovery unit 34. This step also prevents neutralization during the subsequent step of adding acid, as well as preventing overheating and formation of gas, precipitate, etc.

An aqueous solution of an acid, e.g. $H_2SO_4$, HCl, or the like, is passed from unit 13 via stream 14, through valve 15, into the cation exchange unit 6. The resulting stream, containing the metal ions previously exchanged, is passed through valve 18 via stream 19 into the metal recovery unit 34. Deionized water, via stream 20, is again passed through valve 21 into the cation exchange unit 6. The resulting stream, containing traces of the acid used for metal ion removal, is passed through valve 32 via stream 33 into the metal recovery unit 34.

Unit 22 contains selectolyte solution, which, for example, comprises ammonium hydroxide and a chelating agent such as diethylenetriamine, ethylenediaminetetraacetic acid, or triethylenetetraamine. The selectolyte solution is passed via stream 23, through valve 24, into the cation exchange unit 6. The previously regenerated cation exchange resin, in its hydrogen form, exchanges the ammonium cation. The resulting stream is passed through valve 25 via stream 26 into unit 16.

The method of the present invention allows the effluent etchant stream from the throughput of etching solution through the cation exchange unit 6 to be returned to the sump of the etcher 1, the pH now being within process (etching) parameter and the selectolyte preventing the sludging of the metal ions. At the same time, the cation exchange unit is regenerated and is ready for the next throughput of etching solution.

The solution contained in unit 34 may either be subjected to electrowinning of metallic copper, or, if hydrochloric acid is employed in the regeneration cycle of the cation exchange resin, then metallic aluminum is added to the solution contained in unit 34, whereby metal ions contained in the solution are sludged out. The pH of the solution in the metal recovery unit 34 may be monitored by a pH control unit 35. After the completion of either process, the solution now contained in unit 34, is passed through valve 36 via filter 37, through valve 38 via stream 39 to the neutralization unit 30. Stream 20, containing deionized water, is passed through valve 40 via stream 41 into unit 34 to wash and neutralize metal cation sludge. The spent selectolyte solution in unit 16 is now passed via stream 27 through valve 28 and via stream 29 into unit 30 to raise the pH. Additional neutralization may be adjusted as determined by pH monitor unit 43. The pH having reached release parameters, the solution in unit 30 is released via stream 42 to rivers, ponds, sewers, etc.

Some of the advantages of the present invention are as follows:

1. Completely independent adjustment and control of pH and Baumé is possible;
2. Regeneration of etchant can be done in line and in proximity to the etcher;
3. Present dilution methods are no longer required to restore etching solution parameters within control limits;
4. The etcher user can recover copper sulfate or metallic copper on site for possible reuse or resale for potential economic advantage;
5. The quantity of replenisher solution required is significantly reduced, thereby reducing replenishing costs and storage costs by a significant percentage. The quantity actually required is due only to dragout and loss in the ion exchange bed during regeneration;
6. pH adjustment may be performed with a low-cost chemical, i.e. ammonium hydroxide or anhydrous ammonia;
7. Interdependent pH and Baumé adjustment by dilution method is eliminated;
8. Operating costs are reduced, and a safe and continuous etching system can be maintained; and
9. Above all, the inventive steps allow regeneration of etchant, and metal recovery, to be carried out in a single process.

The present invention is, of course, in no way limited to the specific disclosure of the specification and drawing, but also encompasses any modifications within the scope of the appended claims.

What we claim is:

1. A method of regenerating an ammoniacal etchant, said method comprising the steps of:
   withdrawing, from an etcher sump, etching solution containing copper ions at a concentration above an efficiency parameter;
   conveying said etching solution to a cation exchange resin bed for selective removal and retention of said copper ions by said cation exchange resin bed;
   returning regenerated effluent etchant from said cation exchange resin bed to said etcher sump at a copper ion concentration at said efficiency parameter;
   rinsing said cation exchange resin bed with deionized water to remove residual etching solution therefrom;
   conveying effluent deionized water and residual etching solution from said cation exchange resin bed to a metal recovery unit;
   rinsing said cation exchange resin bed with an aqueous solution of an acid to remove said copper ions and to regenerate said cation exchange resin bed;
   conveying effluent aqueous solution of acid and copper ions to said metal recovery unit;
   rinsing said cation exchange resin bed with deionized water to remove residual acid therefrom;
   conveying effluent deionized water and residual acid to said metal recovery unit;
   passing a selectolyte solution through said cation exchange resin bed to enhance the cation retention property thereof and to provide a pH balance during said step of conveying said etching solution to said cation exchange resin bed; and
   conveying spent effluent selectolyte solution to a storage container.

2. A method according to claim 1, which includes the step of preparing said cation exchange resin bed, prior to said step of conveying etching solution thereto, by consecutively passing through said bed an aqueous solution of an acid, deionized water, and a selectolyte solution.

3. A method according to claim 1, in which said selectolyte solution comprises ammonium hydroxide and a chelating agent.

4. A method according to claim 3, in which said chelating agent is selected from the group consisting of an ethylenediaminetetraacetic acid, diethylenetriamine, and triethylenetetraamine.

5. A method according to claim 1, in which said acid is selected from the group consisting of sulfuric acid and hydrochloric acid.

6. A method according to claim 1, which includes the step of monitoring the Baumé of said etching solution in said etcher sump for initiating and halting said step of withdrawing etching solution therefrom when said etching solution has reached a predetermined Baumé level.

7. A method according to claim 1, which includes the steps of monitoring the pH of said etching solution in said etcher sump, and adding replenisher solution to said etching solution to achieve the appropriate etching parameters.

8. A method according to claim 1, which includes the step of recovering etched copper from said metal recovery unit.

9. A method according to claim 8, which includes the step of recovering etched copper by an electrowinning process.

10. A method according to claim 8, which includes the step of recovering etched copper by a metal ion replacement process.

* * * * *